Jan. 17, 1939.      L. K. MITCHELL      2,144,118
COUNTERBALANCED SPRING SUSPENSION FOR VEHICLES
Filed April 9, 1937      2 Sheets-Sheet 1
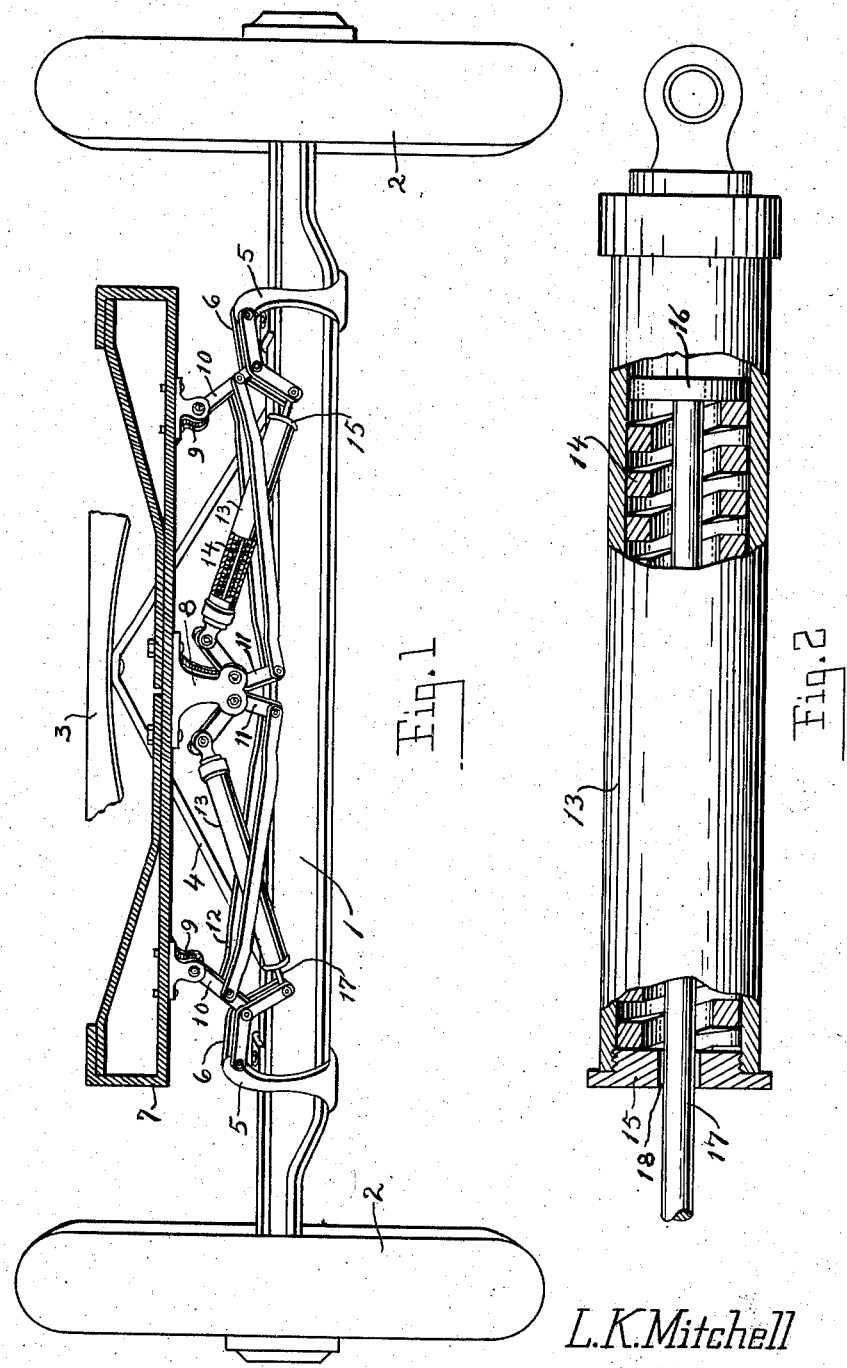
L.K.Mitchell
INVENTOR
BY
ATTORNEY Jan. 17, 1939.  L. K. MITCHELL  2,144,118
COUNTERBALANCED SPRING SUSPENSION FOR VEHICLES
Filed April 9, 1937   2 Sheets-Sheet 2
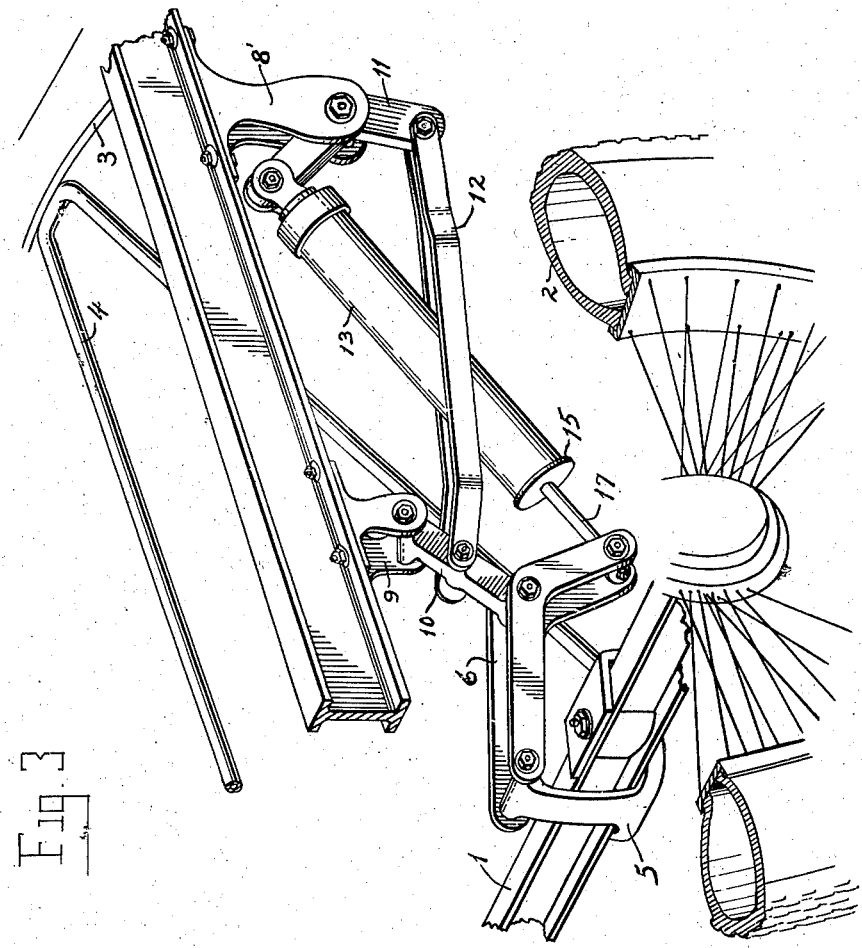
L. K. Mitchell
Inventor
By Arthur Minnick
Attorney Patented Jan. 17, 1939

2,144,118

UNITED STATES PATENT OFFICE 2,144,118

COUNTERBALANCED SPRING SUSPENSION FOR VEHICLES

Louis K. Mitchell, Tampa, Fla.

Application April 9, 1937, Serial No. 135,868

10 Claims. (Cl. 267—20)

A primary object of the present invention is the provision of a simplified construction in which each axle lever and the frame link pivoted thereto have a centralizing lever and resilient connecting member operating independently of the corresponding elements on the other side or at the other end of the frame and connected therewith only by the rigid frame.

A further object of the invention is to provide a structure in which the forces resulting from upward movement of a wheel are applied to exert antagonistic downward stresses upon the frame at separated points, and in which the upwardly directed forces are transmitted to the frame only through pivoted levers or links that are inclined to the vertical.

Another object of the invention is to provide a construction which can be applied to a frame to act either longitudinally or transversely.

A rigid axle at each end of the frame carries the wheels and is held in its proper longitudinal position by radius rods pivoted centrally of the body, while a resilient linkage is interposed between, and connected both to the axles and to the frame, the rigid elements of the linkage being controlled in their relative angular movements about their pivotal connections by coil springs so arranged that forces acting thereon are applied to one end of the spring by means of a lever pivoted to the axle and to the other end of the spring by means of a lever pivoted upon the frame.

In the drawings, Figure 1 is a front view in perspective with the chassis indicated diagrammatically in section and broken away, of a front axle of an automobile having a spring linkage set parallel with the axle; Fig. 2 is an elevation with parts in section of a spring tube or casing, shown on a larger scale than that of Fig. 1; and Fig. 3 is a fragmentary view in perspective of one end of the front of an automobile with parts broken away, showing the spring linkage set longitudinally of the chassis and transversely of the axle.

The axle 1 which carries the wheels 2 is connected with the frame member 3 by a radius rod 4 in a well known manner. Near each end of the axle is a perch 5 to which is pivoted one end of a lever 6. In Figure 1, the transverse frame member 7 is shown as having a bracket 8 about midway of its length and as having a bracket 9 on each side of the bracket 8 and closer thereto than are the perches 5, so that a frame link 10 pivoted at one end to the bracket 9 and at the other end to an adjacent axle lever 6 will extend upward and inward toward the center at a considerable angle to the vertical, 45° being a desirable normal slope.

The center bracket 8 has pivoted thereto two levers 11 shown as bent and as having substantially equal arms, the lower arm of each lever being pivoted to one end of a link 12, the other end of which is pivoted to the frame link 10. Upon the end of the upper arm of the lever 11 is pivoted one end of a tube or casing 13 containing a coil spring 14. This spring bears at one end against a plug 15 secured in one end of the tube, and at its other end, against a head 16 formed on a rod 17 which extends through the coil 14 and through a central hole 18 in the plug 15 to a pivotal connection with the lower end of the adjacent axle lever 6. It will be evident that other means for holding the coil spring may be used.

A part of the pressure due to the weight of the frame and its load is transmitted by the frame links 10 to the levers 6, tending to swing the axle levers downward and outward around their pivotal connections with the perches 5. This downward movement of the levers 6 is resisted by the heads 16 of the rods 17 bearing against the springs 14, the resulting pressure on the springs being transmitted to the plugs 15 and the tubes 13 and thus to the upper ends of the levers 11 tending to swing them outward and downward.

But this movement of the levers 11 is resisted by the links 12 connected to the lower arms of the levers 11 and to the frame links 10 to exert a downward pull almost parallel with the upper arms of the levers 6, which normally slope downward from their pivotal attachment with the perches.

Downward movement of the central bracket 8 carrying the levers 11 tends to move the lower ends of the levers 11 farther away from the perches, and the links 12 resist this movement, thus tending to swing the levers 11 on their pivots on the bracket 8 in a direction opposed to the movement caused by the frame links 10. The levers 11 being maintained by the links 12 within a limited range of pivotal movement, the weight of the frame is carried centrally by the linkages at the lower ends of the levers 11 well below the level of the perches 5, and at the sides, the links 10 also apply weight to the levers 6, so that the frame is suspended on a flexible and resilient chain of levers hung between the perches, which permits a maximum amount of vertical movement of the axle without direct rebound of the spring against the frame as is usual in all ordinary spring suspensions, the spring in the present device being in a floating position, attached neither to the axle nor to the frame by any direct connection.

It will thus be apparent that downward pressure due to the weight of the frame is exerted on all three brackets 9, 8, and 9 to move them downward, and the pivotal movement of the levers 6 on the axle and of the levers 11 on the frame result in the application of this pressure simultaneously from both ends upon the springs 14.

Sudden upward movements of the wheel 2 lifting one end of the axle and carrying the perch upward in an arc, will, of course, lift the upper or outer end of the axle lever 6 at that end of the axle, thus tending to lift the outer end of the frame link 10 pivoted to the lever 6. Such upward movement is resisted by the link 12 which extends downwardly to its pivotal attachment with the lever 11. This resistance to the upward and outward movement of the link 10 due to the link 12 and the resistance of the frame (due to its inertia) to longitudinal inward and upward movement of the link 10, will cause the lever 6 to swing on its pivot on the perch and on its pivot on the frame link 10, thus causing a downward and outward pull on the rod 17, the spring 14, the tube 13, and the upper end of the lever 11, tending to swing the lever on its pivot on the bracket 8 to exert a downward and inward pull on the link 12 and upon the frame link 10, in effect adding to the inertia of the frame in accordance with the shocks received. The pull on the spring tube 13 is upward and on the rod 17 downward, so that at each upward shock on a wheel, two antagonistic downward pulls occur on the frame at separated points on the side receiving the shock, and the spring is compressed by simultaneously applied forces acting on both ends. Because of the inclination of the body links 10, the transmission of any shocks vertically upward from the perch to the frame is made impossible, and any thrust upwardly and inwardly on the links 10 is neutralized in great measure by the outward and downward pull exerted on the spring and the lever 11 on the bracket 8.

In the embodiment of the invention shown in Fig. 3, the linkage is set longitudinally of the frame, the perch 5 being arranged to allow the lever 6 to extend to the rear. Because the length of an automobile is so much greater than its width, and because the length of the elements of the linkage need be no greater when used in the longitudinal position than when used transversely of the frame, the bracket 8' at either the front or the back will be at some distance from the center of the chassis and each bracket will support only a single lever 11 instead of two as in the form shown in Fig. 1. Whether there shall be a bracket for each lever 11 or whether two shall be supported on a single bracket is evidently a matter of convenience, since in either case the weight of the frame and its load is borne by the levers 11 and the links 10 through their connection with the levers 6.

The operation of the linkage is substantially the same when placed longitudinally as when placed transversely, and detailed description will therefore be unnecessary.

This form of linkage acts to maintain the frame in a level position either when set in the transverse or in the longitudinal position.

I claim:

1. In combination, a frame, an axle, and a resilient linkage interposed between the frame and axle and comprising a lever pivoted to the axle, a link pivoted to the frame and to the axle lever, a centralizing lever pivoted to the frame at a point remote from the pivotal connection of the frame link with the frame, resilient means connecting the lower end of the axle lever with the upper end of the frame lever, and means connecting the lower end of the frame lever with the frame link, the arrangement being such that forces tending to swing the axle level downward and outward are transmitted by the connecting means between the frame lever and the axle lever and between the frame lever and the frame link to cause downward stresses on the frame in opposite directions at separated points.

2. In combination, a frame, an axle, and resilient linkage interposed between the frame and the axle and comprising a lever pivoted at its upper end to the axle, a link pivoted at its upper end to the frame and at its lower end to the central portion of the axle lever, a lever having its central portion pivoted to the frame at a point remote from the pivotal connection of the frame link with the frame, means connecting the upper arm of the frame lever with the lower end of the axle lever and means connecting the lower end of the frame lever with the frame link at a point remote from its pivotal connection with the frame, the connecting means between the axle lever and the frame lever including a resilient element permitting a limited swinging movement of the axle lever.

3. A structure as in claim 2 in which the lower end of the frame lever carries the weight of the frame at a level below that of the pivotal connection of the axle lever with the axle.

4. In combination, a frame, an axle, a lever pivoted to the axle, a link pivoted to the frame and to the axle lever normally tending to move the axle lever downward, a lever pivoted to the frame and having two arms, a resilient connection between the upper arm of the frame lever and the axle lever to resist downward movement of the axle lever, a link extending upward and outward from the lower end of the frame lever and connected with the frame link to resist upward movement of the frame link, the frame lever and frame link being pivoted upon the frame at separated points whereby forces applied to the axle lever are transmitted to the frame as antagonistic stresses.

5. In combination, a frame, an axle, an axle lever pivoted for vertical movement, a link pivoted to the frame and to the axle lever whereby to transmit a portion of the weight of the frame to the axle lever, a lever pivoted to the body at a point remote from the axle lever and having an arm extending below the level of the pivotal point of the axle lever upon the axle, a link connecting the lower end of the frame lever to the frame link to transmit pressure applied to the frame lever to said frame link, and a resilient means connecting the axle lever with the upper end of the frame lever to resist angular movement of the frame lever due to pressure upon its lower arm.

6. In a spring suspension for vehicles having a frame and an axle, a resilient suspension between the frame and the axle comprising levers pivoted to the axle, links pivoted to the frame and to the axle levers to press the axle levers downward and laterally, centralizing levers pivoted to the frame, and resilient elements connected to the axle levers and to the centralizing levers to resist lateral movement of the axle levers in opposite directions, whereby the centralizing levers hold the resilient elements under stress to support them indirectly between the frame and the axle.

7. In a vehicle having a rigid axle carrying supporting wheels and having a frame connected to the axle by radius rods, a resilient linkage interposed between the frame and the axle and comprising levers pivoted upon the axle and rigid elements upon the frame having pivotal connection with the frame and with the levers permitting movement transversely of the frame and causing swinging movement of the levers as the axle moves toward and from the frame, and resilient members connected to the levers to resist pivotal movement thereof, and pivoted centralizing means cooperating with the frame and axle to hold the frame centrally of the axle.

8. In combination, a frame, an axle, a resilient linkage interposed between the frame and the axle and comprising levers pivoted to the axle, links pivoted to the frame and to said levers, centralizing means pivoted to the frame and resiliently coordinating the lower ends of the axle levers and the lower ends of the body links, the arrangement being such that any outward movement of the lower ends of the axle levers due to lifting of the axle at that end will tend to increase the inward stress of the body link pivoted thereto and vice versa, creating antagonistic forces upon the frame at separated points, which increase or decrease proportionately tending to antagonize each other and thus to prevent relative movement of the frame.

9. In combination, a frame, an axle, and a resilient linkage interposed between the frame and the axle and comprising levers pivoted to the axle on opposite sides of the center at substantially equal distances therefrom, links pivoted to the frame and to the axle levers, centralizing means pivoted to the frame at substantially equal distances from the links, and resilient elements interposed between and connecting the centralizing means and the axle levers, the arrangement being such that forces acting upon the resilient elements are applied to said elements at one end by means of a lever pivoted to the frame and are applied in the reverse direction at the other end thereof by means of a lever pivoted to the axle.

10. In combination, a frame, an axle, and a resilient linkage interposed between the frame and axle and comprising levers pivoted to the axle upon opposite sides of the center at substantially equal distances therefrom, links pivoted to the frame and to the adjacent axle levers, centralizing means pivoted to the frame at substantially equal distances from the link, and resilient elements interposed therebetween and connected with the axle levers and the links to control their movements independently and to cause antagonistic effects at separated points of the frame.

LOUIS K. MITCHELL.